July 21, 1931. R. J. MILLER 1,815,574
STOCK BAR FEEDER
Filed May 24, 1930 2 Sheets-Sheet 1
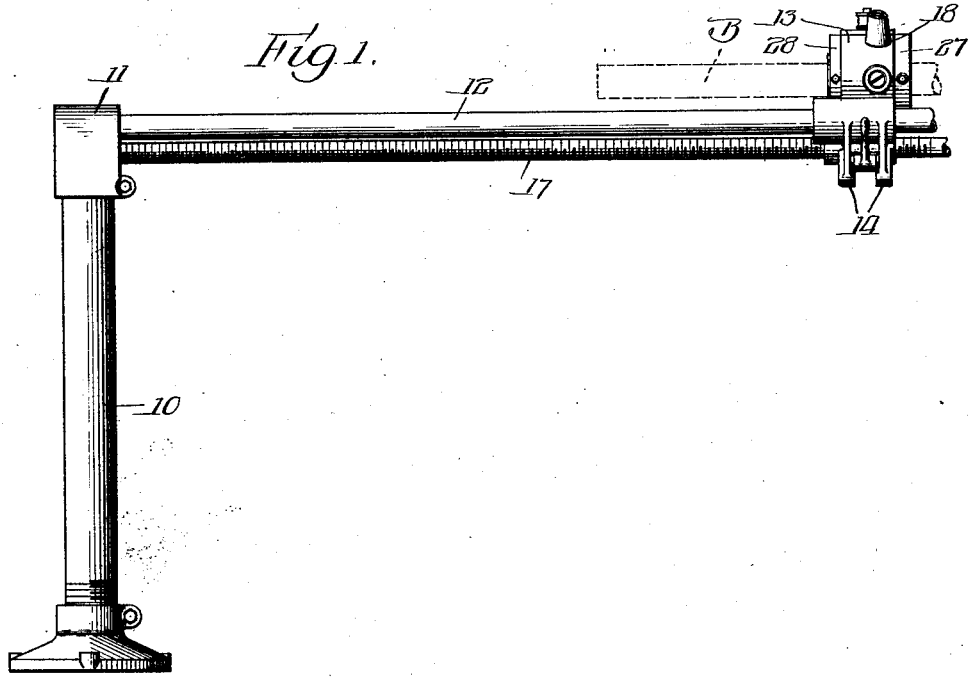
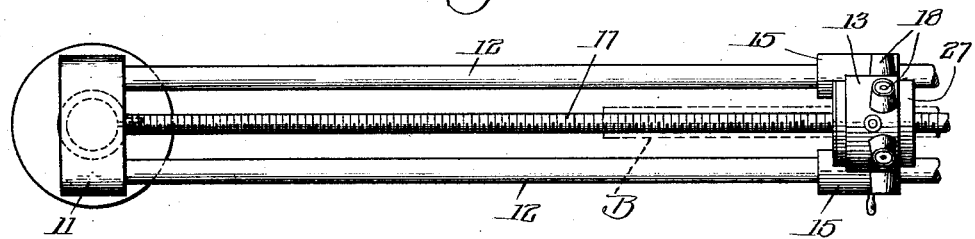
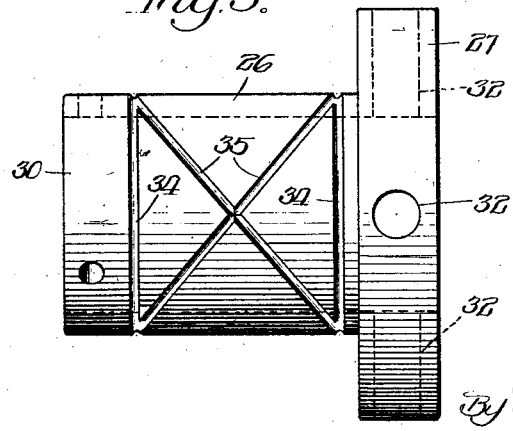
Inventor
Ralph J. Miller
By Fisher, Clapp, Soans & Pond
attys.

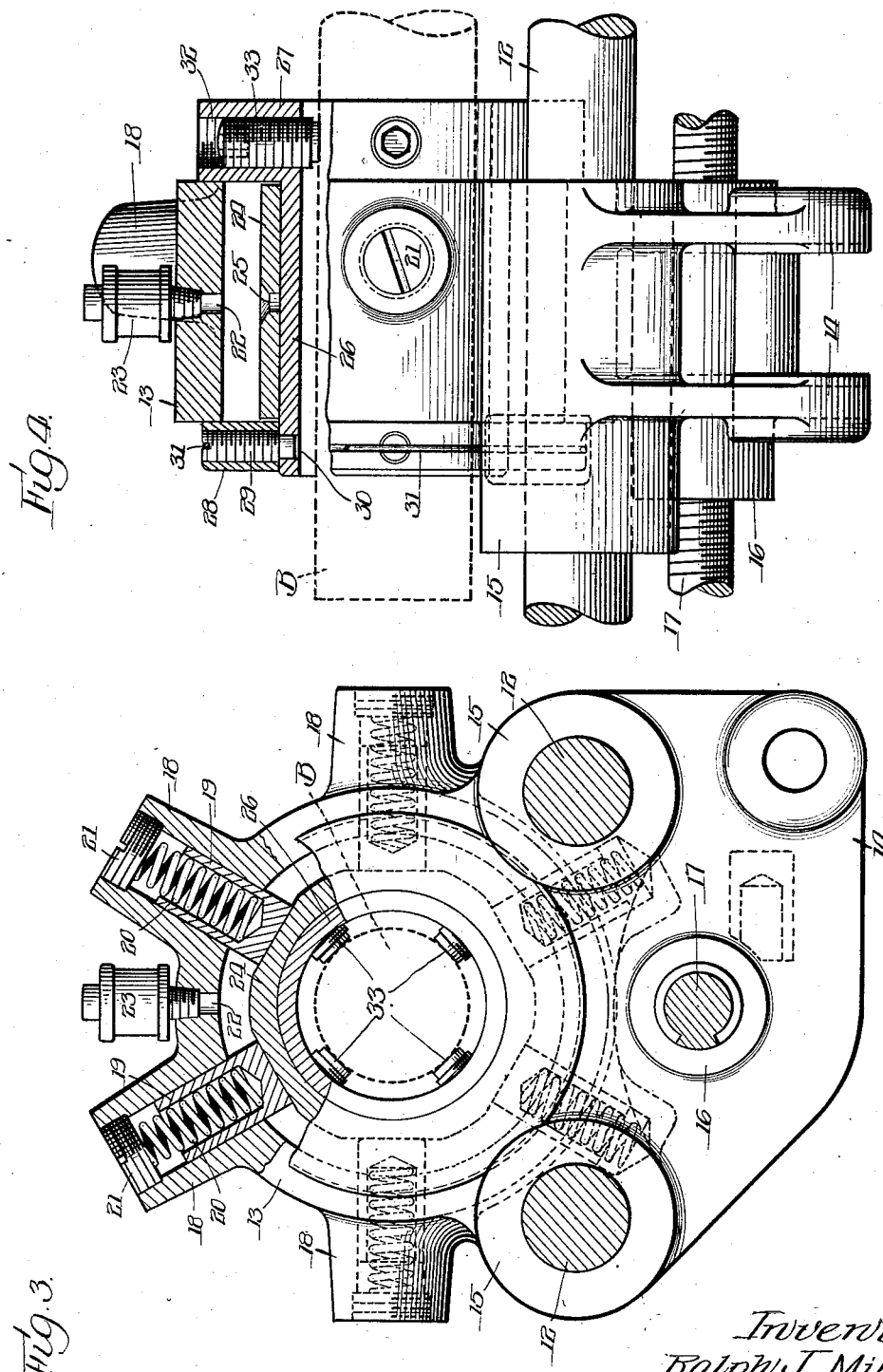

Patented July 21, 1931

1,815,574

UNITED STATES PATENT OFFICE

RALPH J. MILLER, OF MADISON, WISCONSIN, ASSIGNOR TO GISHOLT MACHINE COMPANY, OF MADISON, WISCONSIN, A CORPORATION OF WISCONSIN

STOCK BAR FEEDER

Application filed May 24, 1930. Serial No. 455,173.

This invention relates to a device commonly known as a bar feed attachment for turret lathes, engine lathes, screw machines, and similar machine tools, wherein a bar of stock is fed forwardly through the hollow spindle and the chuck and is operated on by a cutting or threading tool on the turret or cross slide of the machine. A known type of power-operated bar feed consists of a vertical support mounted some distance in rear of the machine, two parallel guide rails mounted at their outer ends on said support and at their inner ends on the head stock of the machine, a stock bar carrier slidably mounted on the rails, a rotatable coarse pitch feed screw engaged with the carrier, and a friction clutch for rotating the feed screw in both directions, the forward rotation bringing up the carrier and advancing the stock to the desired position, and the reverse rotation returning the carrier for a new grip on the stock.

Where a stock bar of considerable length is being operated on, the rapid rotation of the stock bar by the chuck sets up considerable lateral vibration of the trailing end of the stock bar that is mounted in the carrier, and this vibration is transmitted through the carrier to the guide rails on which the carrier slides and to the rear support of the guide rails.

The main object of the present invention has been to provide an improved bar feed of this type wherein the lateral vibrations of the stock bar will be absorbed in the bar feed and carrier itself and thus will not, to any appreciable extent, be transmitted to the guide rails and rail support.

One practical and improved embodiment of the principle of the invention is illustrated in the accompanying drawings, in which—

Fig. 1 is a side elevation of the support, guide rails (broken off) and slidable bar feed mounted on the guide rails.

Fig. 2 is a top plan view of the parts appearing in Fig. 1.

Fig. 3 is an enlarged end elevation, partly in transverse section, of the bar feeder.

Fig. 4 is an enlarged side elevation, partly in longitudinal section, of the bar feeder.

Fig. 5 is a side elevation of the rotating barrel of the bar feeder, showing a lubricating feature thereof.

Referring to the drawings, 10 designates a post mounted on the floor and at its upper end equipped with a cross head 11 in which are securely mounted the outer ends of a pair of parallel spaced guide rails 12, the inner ends of said rails being properly supported on the rear end of the head stock of a lathe or similar machine tool.

Slidably mounted on the rails 12 is the stock bar feeder and carrier, the structural details of which are shown mainly in Figs. 3, 4 and 5. Describing this feeder, 13 designates a hollow circular body member or casing formed with an integral depending web 14 in which latter are cast parallel tubular bearing members 15 that slidably rest on the guide rails 12. Midway between and slightly below the bearings 15 is an internally threaded bearing 16 which is engaged by a feed screw 17 (Figs. 1 and 2) said screw being journaled at its outer end in the cross head 11 and at its inner end being preferably power-operated through a light friction clutch driven by a moving part of the machine.

Equally spaced around the periphery of the casing 13 are a number of radially extending bosses 18, six in number as herein shown, but a greater or less number may be employed. These bosses are axially bored to form cylinders in which are slidably mounted chambered plungers 19. In the chambers of the plungers 19 are thrust springs 20 which at their inner ends abut against the bottoms of the chambers and at their outer ends are footed against caps 21 screwed into the tapped outer ends of the bosses 18, whereby the thrust of each plunger may be finely adjusted by adjusting the caps 21 inwardly or outwardly. In the top of the casing 13 is an oil duct 22, into which is screwed the nozzle of an ordinary oil holder 23.

Within the casing 13 is a floating sleeve 24, the outer surface of which is engaged by the inner ends of the plungers 19. As clearly shown in Fig. 3, the periphery of the sleeve 24 is preferably flattened at the points where it is contacted by the inner ends of the plungers, whereby the sleeve 24 is held against rotation. By reference to Fig. 4 it will be observed that the sleeve 24 is formed with an oil duct 25 located directly below the oil duct 22.

Journaled in the sleeve 24 is a drum or barrel 26, shown in isolated detail in Fig. 5. This barrel 26 has on one end thereof an integral head 27 which overlaps one end of the floating sleeve 24 and casing 13, as clearly shown in Fig. 4, and at its other end receives a removable collar 28 secured thereon by set screws 29, the lower ends of which set screws enter holes 30 in the barrel 26. The collar 28 also overlaps one end of the sleeve 24 and casing 13, thereby, in cooperation with the head 27 locking the sleeve 24 within the casing. To prevent loosening and backing out of the set screws 29 under the rapid rotary movement of the barrel 26, the collar 28 is preferably formed with a peripheral groove to take a locking wire 31.

The head 27 of the barrel is formed with a group of equally spaced internally threaded radial bores 32, herein shown as four in number, although a greater or less number may be employed. Screwed into the bores 32 are threaded clamp screws 33, the inner ends of which are adapted to grip the stock bar, such for instance as a round bar of steel shown in dotted lines at B. Since the four clamp screws 33 are independently adjustable, the stock bar can be securely gripped, even if its axis may not coincide exactly with the axis of the feed device.

Referring to Fig. 5, in the surface of the barrel 26 are formed end and intermediate oil grooves 34 and 35 by which the bearing of the barrel 36 in the sleeve 24 is thoroughly lubricated by oil flowing through the duct 25.

In the operation of the device, after the work has been gripped in the manner described, the feed screw 17 is rotated, and the stock bar is advanced, usually against a turret stock stop, for the threading or cutting thereof; the light friction clutch driving the feed screw slipping until a machined section of the bar has been cut off, whereupon the stock feeder is further advanced to a new position. During the rapid rotation of the trailing end of the stock bar, the lateral vibrations of the latter are manifestly absorbed by the cushioning springs 20 and without any drag on the free rotation of the bar. This prevents the transmission of any severe or substantial vibrations to the guide rails and its support, and thus enables the latter parts to be made lighter than heretofore, and also greatly reduces the chattering and noise.

I have herein disclosed one simple and practical embodiment of the invention which in practice has been found to satisfactorily effectuate the stated purpose or object thereof; but manifestly detail modifications and variations may be resorted to within the purview of the invention as defined in the appended claims.

I claim:

1. In a stock bar feeder of the type described, the combination of a casing mounted for sliding movement on a guide, a floating sleeve in said casing, a bar gripping member journaled in said sleeve, and spring-actuated means in said casing opposing lateral displacement of said sleeve under lateral vibrations of the stock bar.

2. In a stock bar feeder of the type described, the combination of a casing mounted for sliding movement on a guide, a bar gripping member rotatable in said casing, and a group of spaced radial springs mounted in said casing, exerting an inward thrust on said gripping member and serving to cushion the lateral vibrations imparted to said gripping member by the rotating stock bar.

3. In a stock bar feeder of the type described, the combination of a casing mounted for sliding movement on a guide, a floating bearing sleeve in said casing, a bar gripping member journaled in said sleeve, and a group of spaced radial spring plungers mounted in said casing at their inner ends abutting against said sleeve and serving to cushion the lateral vibrations imparted to said gripping member and sleeve by the rotating stock bar.

4. In a stock bar feeder of the type described, the combination of a casing mounted for sliding movement on a guide, a floating bearing sleeve in said casing formed with flat surfaces on its outer periphery, a bar gripping member journaled in said sleeve, and a group of spaced radial thrust spring plungers mounted in said casing at their inner ends seated on said flat surfaces and serving to hold said sleeve against rotation and cushion the lateral vibrations imparted to said gripping member and sleeve by the rotating stock bar.

5. In a stock bar feeder of the type described, the combination of a casing mounted for sliding movement on a guide, a floating bearing sleeve in said casing, a barrel journaled in said sleeve, heads on said barrel overlapping the ends of said sleeve and casing, a group of spaced radial thrust spring plungers mounted in said casing at their inner ends bearing on said sleeve, and a group of screw threaded clamp screws mounted in one of said heads at their inner ends adapted to grip the stock bar.

RALPH J. MILLER.